May 27, 1924.
C. H. WELLER
1,495,828
GLARE SHIELD
Filed Feb. 16, 1924
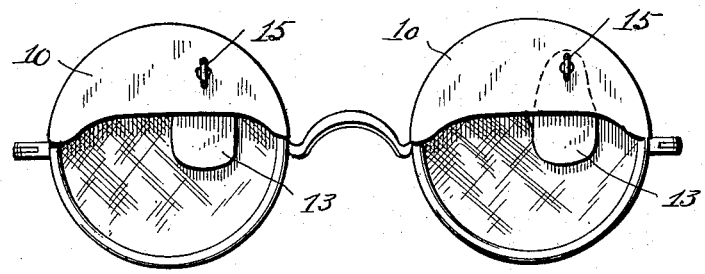
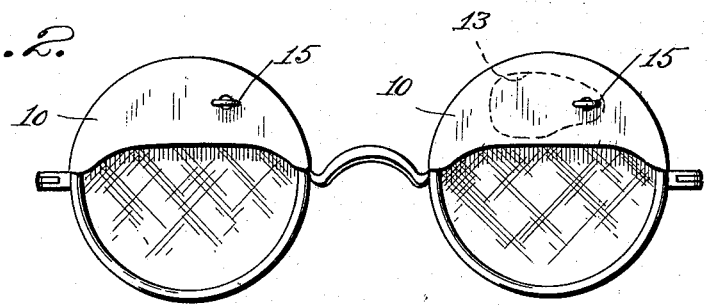
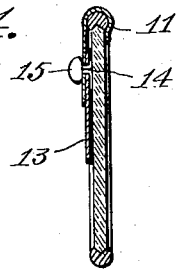
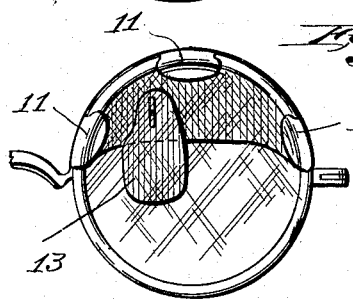
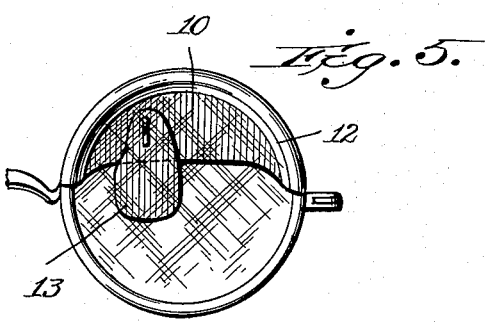
Inventor
Charles H. Weller
By Davis & Davis
Attorneys Patented May 27, 1924.

1,495,828

UNITED STATES PATENT OFFICE.

CHARLES H. WELLER, OF ALLENTOWN, PENNSYLVANIA.

GLARE SHIELD.

Application filed February 16, 1924. Serial No. 693,233.

*To all whom it may concern:*

Be it known that I, CHARLES H. WELLER, a citizen of the United States of America, and a resident of Allentown, county of Lehigh, and State of Pennsylvania, have invented certain new and useful Improvements in Glare Shields, of which the following is a full and clear specification.

This invention relates to that type of glare-shields adapted for attachment to eyeglasses and spectacles and whose function is the protection of the eyes against the blinding glare of light from approaching headlights carried by automobiles, locomotives and trolleys, as well as from the direct light of the sun while driving or from strong light while reading, as more fully hereinafter set forth.

In the drawing—

Fig. 1 is a front elevation of a pair of spectacles with my invention attached thereto, the two glare-shields being swung down into operative position;

Fig. 2 is a similar view showing the two glare-shields swung up into inoperative position;

Fig. 3 is a rear view of one of the lens-rings showing the glare-shield turned down;

Fig. 4 is a vertical sectional view taken through Fig. 3;

Fig. 5 is a rear view of one of the lens-rings showing a slightly modified form of clip for securing the visor to the lens-ring.

In its preferred form, my device consists of two opaque or translucent visors 10, one for each lens-ring, these visors being shaped to conform to the curvature of the ring and adapted to shield the upper part of the eye. I prefer to make these visor-shields of thin light flexible celluloid of a translucent tint, and I prefer detachably attaching them to the lens-rings by means of resilient clips 11 formed integral with the shields at separated points around the upper curved edges thereof and adapted to spring over the lens-rings. In this way, the visor-shields are detachably attached to the lens-rings so that when it is desired to use the glasses without the shields, they may be removed therefrom. Instead of separated spring clips 11, I may employ a continuous or substantially continuous spring clip-flange 12, as shown in Fig. 5. As is obvious, I also may attach the visors permanently to the lens-rings, if desired. These visor-shields desirably, as shown, lie flat against the front side of the glasses so as to be supported and braced by the glasses and thus be less liable to be knocked off or broken or torn than if they projected forwardly away from the glasses.

These visor-shields serve to protect the eyes from light-strain while driving against the sun and also while reading. To adapt my device for effective use in shielding the eyes from the blinding glare of an approaching headlight, I provide each one of the visors with a supplemental glare-shield 13, consisting preferably of a small sheet of tinted celluloid and pivotally attached to the inner face of the visor-shield in such manner as to be swung up to a position behind the shield when not in use and to be swung down to a pendent position when in use. These supplemental shields are located a little to the left side of the center of the glasses and are so positioned that each will, when swung down, lie in the line of vision between its associated eye and the oncoming headlight and thus shield both eyes from the glare of the headlight. The special advantage in this arrangement of supplemental glare-shields is that the wearer at all times has an ample view of surrounding objects, thereby enabling him to guide his car with safety not only with respect to the oncoming car carrying the headlight, but also with regard to other objects. When not in use, these supplemental shields are folded up in the space between the visor-shields and the glasses and are entirely out of the way, while at the same time the visor-shields are in position for use against blinding sunlight, should the driver be driving against the sun. These visor-shields are also of advantage in reading under a strong light, since they relieve the eyes of a material part of the light-strain.

The pivot for mounting the supplemental shield is shown at 14. The outer end of this pivot is provided with a small flat head 15 which may be used as a thumb-piece for swinging the supplemental shield into and out of position.

A feature of importance lies in the fact that the two drop shields 13 are laterally adjustable with respect to the lens centers in order that these drop shields may be adjusted to suit the differences that exist in persons as regards the distance between the pupils of the eyes. In most cases the drop shields will probably hang straight down, but in many instances it will be found that these drop shields must be swung a little to one side or the other in order to accommodate the distance between the pupils.

What I claim is:

1. A glare-shield for eyeglasses consisting of visor-shields adapted to be attached to the upper parts of the lens-rings, each of these visor-shields being provided with a supplemental glare-shield removably attached to the visor-shields and adapted to be moved down to a point below the lower edge of the same for use and to be moved up above the lower edge of the visor-shields when not in use.

2. In combination with eyeglasses, a glare-shield consisting of a pair of visor-shields attached to the upper parts of the lens-rings, each of these visor-shields being provided with a supplemental glare-shield, each of said supplemental glare-shields consisting of a flat member pivotally attached to the visor-shield in the space between the same and the glass and adapted to be swung down into position for use and to be swung up to a position behind the glare-shield, the pivots of the supplemental glare-shields being each provided with an operating thumb-piece at its forward end.

3. A glare-shield for eyeglasses consisting of a pair of visor-shields adapted to be attached to the upper parts of the lens-rings, each of these visor-shields being provided with a supplemental glare-shield adapted to be moved into position for use and out of use position.

4. A glare-shield for eyeglasses consisting of a pair of visor-shields adapted to be attached to the upper parts of the lens-rings, each of these visor-shields being provided with a supplemental glare-shield, each of said glare-shields consisting of a light-obstructing member pivotally attached to the visor-shield in such manner as to permit it to be swung down into position for protecting the eyes.

5. In combination with eyeglasses, a glare-shield consisting of a pair of visor-shields attached to the upper parts of the lens-rings, each of these visor-shields being provided with a supplemental glare-shield, each of said supplemental glare-shields consisting of a flat member pivotally attached to the visor-shield in the space between the same and the glass and adapted to be swung down into position for use and to be swung up to a position behind the glare-shield.

In testimony whereof I hereunto affix my signature.

CHARLES H. WELLER.